United States Patent Office 2,902,475
Patented Sept. 1, 1959

2,902,475

LINEAR POLYAMIDE RESINS

Charles A. Burkhard, Alplaus, N.Y., assignor to General Electric Company, a corporation of New York No Drawing. Application April 13, 1956
Serial No. 578,150

7 Claims. (Cl. 260—78)

This invention relates to linear, fiber-forming polyamide resins. More particularly, this invention is concerned with highly polymeric linear polyamide resins prepared by reacting an alkoxybenzene dicarboxylic acid with a diamine.

Heretofore a number of linear polyamide resins have been known in the art including the polymeric polyamide formed from adipic acid and hexamethylenediamine which has gained universal acceptance as a fiber-forming material, as a film-forming material and as a molding material. However, this particular polyamide and other nonaromatic polyamides are disadvantageous in that they have very low softening points. In an attempt to provide polymeric polyamides having higher melting points, i.e., greater form stability at elevated temperatures, polymeric polyamide resins have been prepared from aromatic dicarboxylic acids and various diamines. However, the formation of these materials has several inherent difficulties. The first difficulty is that the aromatic dicarboxylic acids are relatively insoluble in the diamines and it has been difficult, therefore, to obtain the degree of reaction desired to produce a polymer having a high enough molecular weight to have fiber-forming characteristics. Furthermore, when such fiber-forming polyamide resins have been formed, they have not been characterized by the desired degree of hydrolytic stability.

I have now discovered a particular class of polyamide resins which avoid all the disadvantages of prior art and are useful as fiber materials, film materials, and molded articles. These polyamide resins are characterized by their ease of formation, by their hydrolytic stability and by the form stability they exhibit at elevated temperatures. This particular group of polyamides are formed by effecting reaction at an elevated temperature between an alkoxybenzene dicarboxylic acid and a diamine.

The alkoxybenzene dicarboxylic acids within the scope of the present invention are alkoxy isophthalic or alkoxy terephthalic acids having a formula selected from the class consisting of (1)
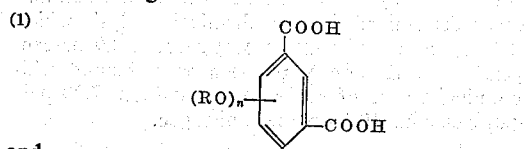

and (2)
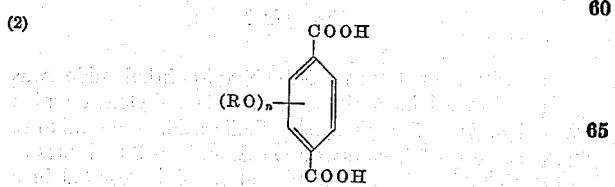

where R is a lower alkyl radical, e.g., an alkyl radical containing from 1 to 4 carbon atoms, for example, methyl, ethyl, propyl, isopropyl, n-butyl, etc.; and n is an integer equal to from 1 to 3, inclusive. The preferred alkoxybenzene dicarboxylic acids of the present invention are the monomethoxybenzene dicarboxylic acids characterized by the following formulae:

(3)
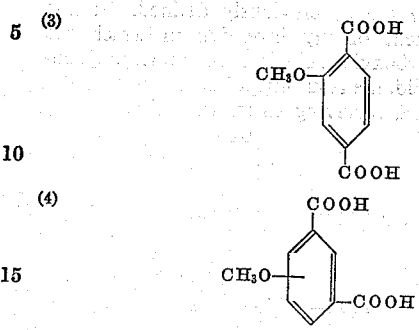

(4)

Typical alkoxybenzene dicarboxylic acids within the scope of Formulae 1, 2, 3 or 4 include, for example, methoxyterephthalic acid, 2-methoxyisophthalic acid, 4-methoxyisophthalic acid, 5-methoxyisophthalic acid, ethoxyterephthalic acid, butoxyterephthalic acid, 4-ethoxyisophthalic acid, 4-isopropoxyisophthalic acid, etc. Most of the alkoxybenzene dicarboxylic acids within the scope of Formulae 1 to 4 are known in the art and are prepared, for example, by converting a dimethylphenol to the corresponding dimethylanisole and oxidation of the two methyl groups of the anisole to carboxyl groups.

The diamines employed in the practice of the present invention may be characterized by the following formula:

(5) 

where R' is a divalent hydrocarbon radical. In the preferred class of materials of the present invention R' is a polymethylene radical, e.g., ethylene, trimethylene, tetramethylene, pentamethylene, hexamethylene, decamethylene, tridecamethylene, octadecamethylene, etc. radicals. However, R' may also represent alkylene radicals, such as propylene, butylene, etc. Other radicals represented by R' include cyclohexylene, p-xylylene, etc.

In preparing the polyamide resins of the present invention the alkoxybenzene dicarboxylic acid and the diamine are mixed together and heated to the reaction temperature. This reaction temperature may vary within wide limits, but I prefer to use temperatures which vary from about 175 to 220° C. for conducting the reaction. The reaction may be carried out in any suitable reaction vessel which may be opened to the atmosphere or which may be shielded from the atmosphere by means of a suitable inert gas, such as, for example, nitrogen, carbon dioxide, etc. However, it is preferred to carry out the reaction in the presence of an inert atmosphere since the presence of oxygen adjacent to the reaction mixture at the elevated temperatures employed tends to cause some discoloration of the resulting polymeric polyamide. The reaction of the present invention proceeds in two stages. In the first stage two moles of the diamine react with one mole of the alkoxybenzene dicarboxylic acid. In the second stage of the reaction, further amide formation takes place to yield polymeric materials in which each structural unit contains the nucleus of one mole of an alkoxybenzene dicarboxylic acid and the nucleus of one mole of a diamine. Thus, the recurring structural units found in the polyamide resins of the present invention are defined by the following formulae:

(6)
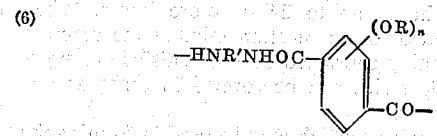

or (7) 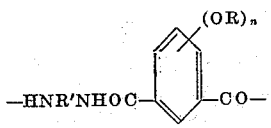

where R, R' and $n$ are as previously defined. In the preferred embodiment of my invention in which the alkoxybenzene dicarboxylic acid is a monomethoxybenzene dicarboxylic acid, the resulting polymeric polyamides contain the following recurring structural units:

(8) 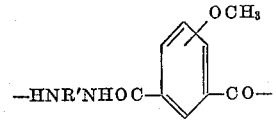

or (9) 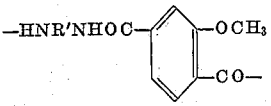

where R' is as defined above.

Since the preferred class of diamides employed in the practice of my invention are the polymethylene diamines, with the preferred specific diamine being hexamethylene diamine, the preferred polymeric polyamide of the present invention is a polyhexamethylene methoxybenzene dicarboxylic acid amide.

In carrying out the preparation of the novel polyamides of the present invention, I prefer to employ equimolar amounts of the diamine and the alkoxybenzene dicarboxylic acid since the desired polymeric material contains one unit of each of the two ingredients per recurring structural unit. However, it is also possible to prepare the same polymeric material using an excess of either of the two ingredients. Thus, excess amounts of either ingredient up to about 2 moles of one ingredient per mole of the second ingredient may be employed.

The time required to form the polyesters of the present invention depends upon the particular reactants employed, the particular reaction temperature employed, the ratio of ingredients employed, the presence or absence of a catalyst for the reaction, and the degree of polymerization desired in the final product. In general, it is preferred to prepare polymeric products which have a molecular weight from about 3000 to 15,000 with the preferred molecular weight range being from about 8000 to 11,000. With molecular weights in the broad range, polymeric materials are formed which are fusible at elevated temperatures and may be formed into fibrous materials by usual methods. Thus, where a polymeric polyamide resin is formed having a molecular weight in excess of 3000, the material is heated to a temperature above its fusing point and filaments are extruded from the fused mass. These filaments may be then drawn by conventional cold drawing processes to over 50 to 100 times their original length to provide polymeric polyamide fibers of macromolecular size containing highly oriented molecules. The resulting fibers exhibit very high tensile strength, are relatively insoluble in common organic solvents and are hydrolytically stable. To obtain the desired molecular weights of 3000 to 15,000, it is necessary to heat the reaction mixture, for example, at a temperature of about 200° C. for a time which may vary from 8 to 24 hours when the two ingredients are hexamethylene diamine and 4-methoxyisophthalic acid. However, with other combinations of ingredients the time required for the reaction can vary from times as low as 3 to 4 hours up to 24 or more hours. When catalysts are added to the reaction mixture the reaction time is considerably shortened so that satisfactory polymeric polyamide resins can be formed in times as low as 30 to 45 minutes.

Among the catalysts which may be used in forming the polymeric polyamides of the present invention are included all of the typical catalysts used in amide formation in organic chemistry. Specific catalysts include both alkaline catalysts and acidic materials. Thus, suitable catalysts include alkali metal hydroxides or carbonates such as sodium or potassium hydroxide, sodium carbonate, stannous chloride, silver chloride, etc. Where catalysts are employed in the polymeric polyamide formation, I prefer to use from about 0.001 to 0.1 percent by weight of the catalyst based on the weight of the reaction mixture.

Since water is formed during the course of the polymeric polyamide reaction, it is desirable that means be provided for removing this water from the reaction vessel as it is formed. This may be done by passing a stream of inert gas through the reaction mixture to carry off water as formed. In addition, it is found that after the reaction is substantially completed the reaction mixture contains some dissolved water as well as other low molecular weight relatively volatile materials. These materials are advantageously removed from the reaction mixture by heating this mixture at elevated temperatures for several minutes. Suitable conditions for this "devolatilization" step include temperatures of about 225° to 275° C. at pressures of less than 10 mm.

The following examples are illustrative of the practice of my invention and are not intended for purposes of limitation.

*Example 1*

A mixture of 1.69 moles of hexamethylene diamine and 1 mole of 4-methoxyisophthalic acid was heated at a temperature of 200° C. for 24 hours. At the end of this time the resulting material was heated further at 230° C. and 1 mm. to remove any unreacted hexamethylene diamine and other volatile products. This resulted in a tough, clear polymeric polyamide resin containing the following recurring structural unit:

(10) 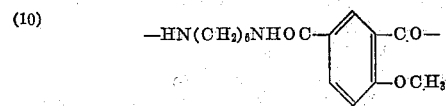

and having an average molecular weight of about 5000. When this material was heated it softened and fibers were drawn from filaments formed from the softened resin. When this same procedure was followed employing isophthalic acid in place of the 4-methoxyisophthalic acid it was found that at the end of 24 hours at 200° C. all of the acid did not go into solution. This compares with the fact that with the 4-methoxyisophthalic acid, complete solution of the acid in the diamine was obtained in the first 20–30 minutes at 200° C. The composition of the polymeric polyhexamethylene 4-methoxyisophthalamide was determined from a chemical analysis which showed the presence of 65.9 percent carbon, 8.9 percent hydrogen, and 11.2 percent nitrogen as compared with the theoretical values of 65.19 percent carbon, 7.29 percent hydrogen and 10.14 percent nitrogen.

*Example 2*

A polyhexamethylene 5-methoxyisophthalamide was prepared by mixing 1.69 moles of hexamethylene diamine with 1 mole of 5-methoxyisophthalic acid. This mixture was heated for 24 hours at 200° C. and for 30 minutes at 230° C. under a pressure of 1 mm. This resulted in a tough, transparent resin from which fibers were formed by the method described in Example 1. Chemical analysis of this resin showed the presence of 63.1 percent carbon, 8.6 percent hydrogen and 11.5 percent nitrogen as compared with the theoretical values of 65.19 percent carbon, 7.29 percent hydrogen and 10.14 percent nitrogen. This resin contained the following recurring structural unit:

(11)

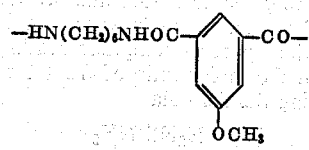

Example 3

A polyhexamethylene methoxyterephthalamide resin was prepared by mixing 1.69 parts of hexamethylenediamine with 1 part of methoxyterephthalic acid. This mixture was heated at 200° C. for 24 hours. At the end of this time the resulting product was allowed to return to room temperature without the devolatilization step. This resulted in a tough, flexible transparent resinous material from which fibers could be formed by the method of Example 1. This resin contained the following recurring structural unit:

(12)

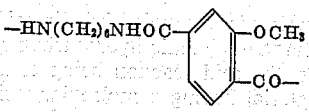

Example 4

A polypropylene 4-methoxyisophthalamide resin can be prepared by mixing 1 mole of propylene diamine with 1 mole of 4-methoxyisophthalic acid and heating the resulting mixture at 200° C. for 24 hours. At the end of this time the reaction mixture is heated at 230° C. for 30 minutes at 1 mm. to remove any volatile material. The resulting material can be cast into suitable forms such as caster wheels, electrical insulation parts, etc. The resulting parts will be very shock resistant, tough, flexible, and will be resistant to hydrolytic degradation.

Although the foregoing examples have not shown all of the possible modifications of the present invention, it should be understood that diamines other than the particular diamines described in the examples may be employed with success in the practice of this invention. The diamines which are useful in this invention are those heretofore described. It should also be understood that alkoxybenzene dicarboxylic acids other than those specifically described may also be employed. In addition, a resinous material may be prepared employing more than one diamine or more than one alkoxybenzene dicarboxylic acid in the same reaction mixture.

Although the foregoing description of the invention has described the formation of polymeric polyamides employing as the acid ingredient the alkoxybenzene dicarboxylic acids themselves, it should be understood that derivatives of the acids may also be employed. Thus, instead of using the acid, I can also employ the acid chlorides as well as the lower alkyl esters of the acids, such as, for example, the dimethyl ester, the diethyl ester, the dipropyl ester, etc. In addition, half esters and half acid chlorides may also be employed in the practice of the invention.

The polymeric polyamides of the present invention may be employed in the manufacture of fabrics by incorporating the fibers into fabrics by conventional methods. In addition, these polymeric materials may be employed as films which have the utility of other transparent flexible high strength films. In addition, these polymeric materials may be employed as insulation for electrical conductors by extruding the resin over conductor materials. And the resins of this invention may be empolyed in convtional molding operations to form products of any desired shape and size.

What I claim as new and desire to secure by Letters Patent of the United States is:

1. The method of forming a polymeric polyamide having fiber-forming characteristics and orientability by cold drawing, said polyamide having a molecular weight of at least 3000 and being composed of the recurring structural unit selected from the class consisting of

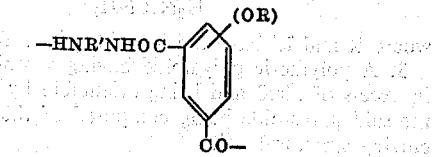

and

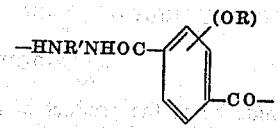

which comprises heating in the molar ratio of from 1 to 2 mols of an alkoxybenzene dicarboxylic acid having a formula selected from the class consisting of

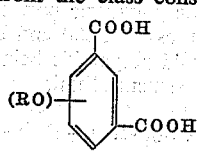

and

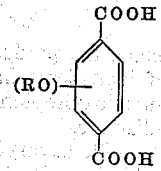

with from 2 to 1 mols of a diamine having the formula $$H_2NR'NH_2$$

where R is a lower alkyl radical having from 1 to 4 carbon atoms, R' is a divalent saturated aliphatic hydrocarbon radical of at least two carbon atoms, the said reaction being continued until a polymeric material having a molecular weight in excess of 3000 is obtained.

2. A fiber-forming polymeric polyamide having a molecular weight in excess of 3000 and being orientable by cold drawing, the said polyamide being composed of the recurring structural unit selected from the class consisting of

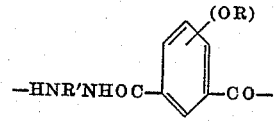

and

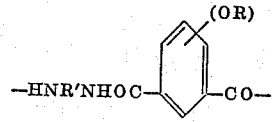

where R is a lower alkyl radical having from 1 to 4 carbon atoms and R' is a divalent saturated aliphatic hydrocarbon radical of at least two carbon atoms, the said polyamide being the product of reaction under heat of a mixture of ingredients in the molar ratio of from 1 to 2 mols of an alkoxybenzene dicarboxylic acid having a formula selected from the class consisting of

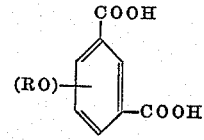

and

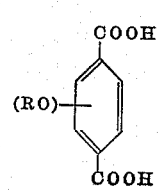

with from 2 to 1 mols of a diamine having the formula

H₂NR'NH₂ where R and R' have the meaning given above.

3. A polymeric polyamide having a molecular weight in excess of 3000 and being orientable by cold drawing, the said polyamide being composed of the following recurring structural unit

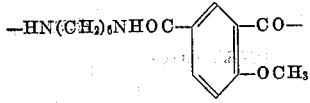

the said polyamide being the product of reaction under heat of a mixture of ingredients in the molar ratio of from 1 to 2 mols 4-methoxyisophthalic acid and from 2 to 1 mols hexamethylenediamine.

4. A fiber-forming polymeric polyamide having a molecular weight in excess of 3000 and being orientable by cold drawing, the said polyamide being composed of the following recurring structural unit

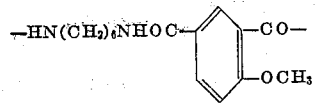

the said polyamide being the product of reaction under heat of a mixture of ingredients in the molar ratio of from 1 to 2 mols 5-methoxyisophthalic acid and 2 to 1 mols hexamethylene diamine.

5. A polymeric polyamide having fiber-forming characteristics, being orientable by cold drawing and having a molecular weight of at least 3000, the said polyamide being composed of the following recurring structural unit

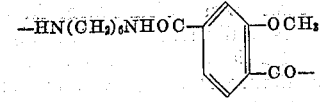

the said polyamide being the product of reaction under heat of a mixture of ingredients in the molar ratio of from 1 to 2 mols of 3-methoxyterephthalic acid and 2 to 1 mols of hexamethylenediamine.

6. The method of forming a polymeric polyamide having fiber forming characteristics and orientability by cold drawing, said polyamide having a molecular weight of at least 3000, which process comprises heating a mixture of ingredients in the molar ratio of from 1 to 2 mols of a diamine having the formula

H₂NR'NH₂ with from 2 to 1 mols methoxyterephthalic acid, where R' is a divalent saturated aliphatic hydrocarbon radical of at least two carbon atoms, the said reaction being continued until a polymeric material having a molecular weight in excess of 3000 is obtained.

7. The method of forming a polymeric polyamide having fiber forming characteristics and orientability by cold drawing, said polyamide having a molecular weight of at least 3000, which process comprises heating a mixture of ingredients in the molar ratio of from 1 to 2 mols of a diamine having the formula

H₂NR'NH₂ with 2 to 1 mols of methoxyisophthalic acid, where R' is a divalent saturated aliphatic hydrocarbon of at least two carbon atoms, the said reaction being continued until a polymeric material having a molecular weight in excess of 3000 is obtained.

References Cited in the file of this patent

UNITED STATES PATENTS

| | | |
|---|---|---|
| 2,252,555 | Carothers | Aug. 12, 1941 |
| 2,272,466 | Hummel et al. | Feb. 10, 1942 |
| 2,715,620 | Carlston et al. | Aug. 16, 1955 |
| 2,724,723 | Bock | Nov. 22, 1955 |
| 2,742,496 | Lum et al. | Apr. 17, 1956 |

FOREIGN PATENTS

| | | |
|---|---|---|
| 956,545 | France | Feb. 1, 1950 |

OTHER REFERENCES

Fosdick et al.: J.A.C.S., vol. 63, pages 1277–1279, May 1941. (Copy in Sci. Libr.)

UNITED STATES PATENT OFFICE
CERTIFICATE OF CORRECTION

Patent No. 2,902,475                                  September 1, 1959

Charles A. Burkhard

It is hereby certified that error appears in the printed specification of the above numbered patent requiring correction and that the said Letters Patent should read as corrected below.

Column 6, lines 50 to 55, the formula should read as shown below instead of as in the patent:

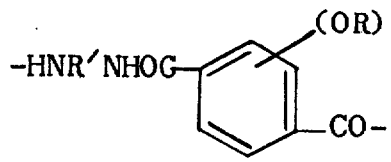

Signed and sealed this 27th day of September 1960.

(SEAL)
Attest:

KARL H. AXLINE  
Attesting Officer

ROBERT C. WATSON  
Commissioner of Patents